United States Patent [19]
Ho

[11] Patent Number: 5,959,614
[45] Date of Patent: Sep. 28, 1999

[54] POINTING CONTROL SYSTEM FOR CONTROLLING ROTATIONS OF AN OBJECT WITHIN A THREE DIMENSIONAL VIEW

[75] Inventor: Heng-Chun Ho, Taipei, Taiwan

[73] Assignee: Primax Electronics Ltd., Taipei Hsien, Taiwan

[21] Appl. No.: 08/940,836

[22] Filed: Sep. 30, 1997

[51] Int. Cl.$^6$ ....................................... G09G 5/08
[52] U.S. Cl. ......................... 345/167; 345/163; 345/164
[58] Field of Search ................................... 345/157, 163, 345/164, 165, 166, 167

[56] References Cited

U.S. PATENT DOCUMENTS

| | | | |
|---|---|---|---|
| 5,019,809 | 5/1991 | Chen | 345/163 |
| 5,095,303 | 3/1992 | Clark et al. | 345/164 |
| 5,311,209 | 5/1994 | Lin | 345/165 |
| 5,477,237 | 12/1995 | Parks | 345/163 |
| 5,563,631 | 10/1996 | Masunaga | 345/167 |
| 5,565,891 | 10/1996 | Armstrong | 345/156 |
| 5,619,231 | 4/1997 | Shouen | 345/164 |

*Primary Examiner*—Matthew Luu

[57] ABSTRACT

The present invention discloses a pointing control system for controlling rotations of an object within a three dimensional view. The three dimensional view comprises first axis and second axes which are perpendicular to each other. The pointing control system comprises an image displaying device for displaying the three dimensional view, a computer electrically connected to the displaying device and a pointing device electrically connected to the computer. The computer comprises a program for controlling image display of the displaying device and rotations of the object within the three dimensional view. The pointing device comprises a housing and a first pointing controller installed in the housing. The first pointing controller comprises: a ball rotatably installed inside of the housing; a first rod and a second rod rotatably installed in the housing and attached to the ball for interacting with the ball to detect rotations of the ball in two different directions; a first angle displacement detector for detecting rotations of the first rod and generating a corresponding first angle displacement signal; and a second angle displacement detector for detecting rotations of the second rod and generating a corresponding second angle displacement signal. When the program receives the first angle displacement signal, the program will transform the first angle displacement signal into a first rotation angle and then rotate the object along the first axis about the first rotation angle. And when the program receives the second angle displacement signal, the program will transform the second angle displacement signal into a second rotation angle and then rotate the object around the second axis for the second rotation angle.

8 Claims, 4 Drawing Sheets

POINTING CONTROL SYSTEM FOR CONTROLLING ROTATIONS OF AN OBJECT WITHIN A THREE DIMENSIONAL VIEW

BACKGROUND OF THE INVENTION

1. Field of the Invention

The present invention relates to a pointing control system, and more particularly, to a pointing control system for controlling rotations of an object within a three dimensional view displayed over a displaying device.

2. Description of the Prior Art

Pointing devices such as mouse, track ball, etc. are commonly used in personal computer systems for controlling movements of an object within a two dimensional image displayed over a displaying device. As for three dimensional computer applications currently prevailing such as TV games, virtual reality applications, etc., control of three dimensional actions such as rotations of an object around various axes of a three dimensional view using a traditional pointing device is usually implemented in a piecemeal manner. For example, a user has to identify one of the axes first, and then use a cursor to guide rotations of an object around the selected axis. Such method is not very convenient in controlling such three dimensional rotations.

SUMMARY OF THE INVENTION

It is therefore a primary objective of the present invention to provide a pointing control system which can be easily used to control rotations of an object in a three dimensional view.

Briefly, in a preferred embodiment, the present invention includes a pointing control system for controlling rotations of an object within a three dimensional view, the three dimensional view comprising first ans second axes which are perpendicular to each other, the pointing control system comprising an image displaying device for displaying the three dimensional view, a computer electrically connected to the displaying device and a pointing device electrically connected to the computer, the computer comprising a program for controlling image display of the displaying device and rotations of the object within the three dimensional view, the pointing device comprising a housing and a first pointing controller installed in the housing, the first pointing controller comprising:

(1) a ball rotatably installed inside the housing;
(2) a first rod and a second rod rotatably installed in the housing and attached to the ball for interacting with the ball to detect rotations of the ball in two different directions;
(3) a first angle displacement detector for detecting rotations of the first rod and generating a corresponding first angle displacement signal; and
(4) a second angle displacement detector for detecting rotations of the second rod and generating a corresponding second angle displacement signal;

wherein when the program receives the first angle displacement signal, the program will transform the first angle displacement signal into a first rotation angle and then rotate the object along the first axis about the first rotation angle, and when the program receives the second angle displacement signal, the program will transform the second angle displacement signal into a second rotation angle and then rotate the object along the second axis about the second rotation angle.

It is an advantage of the present invention that the pointing device provides a rotatable ball which can be rotated to control rotations of the object along two axes in a three dimensional view.

These and other objectives of the present invention will no doubt become obvious to those of ordinary skill in the art after having read the following detailed description of the preferred embodiment which is illustrated in the various figures and drawings.

BRIEF DESCRIPTION OF THE DRAWINGS

Please refer to FIG. 1. FIG. 1 is a schematic diagram of a pointing control system 10 according to the present invention. System 10 is a portable computer which comprises a displaying device 14 for displaying an object 18 within a three dimensional view 16 over a displaying screen 17, a computer 20 connected to the displaying device 14 with a keyboard 22 installed above it, and a pointing device 12 installed in the computer 20 for controlling rotations of the object 18 within the three dimensional view 16.

Figure 1:
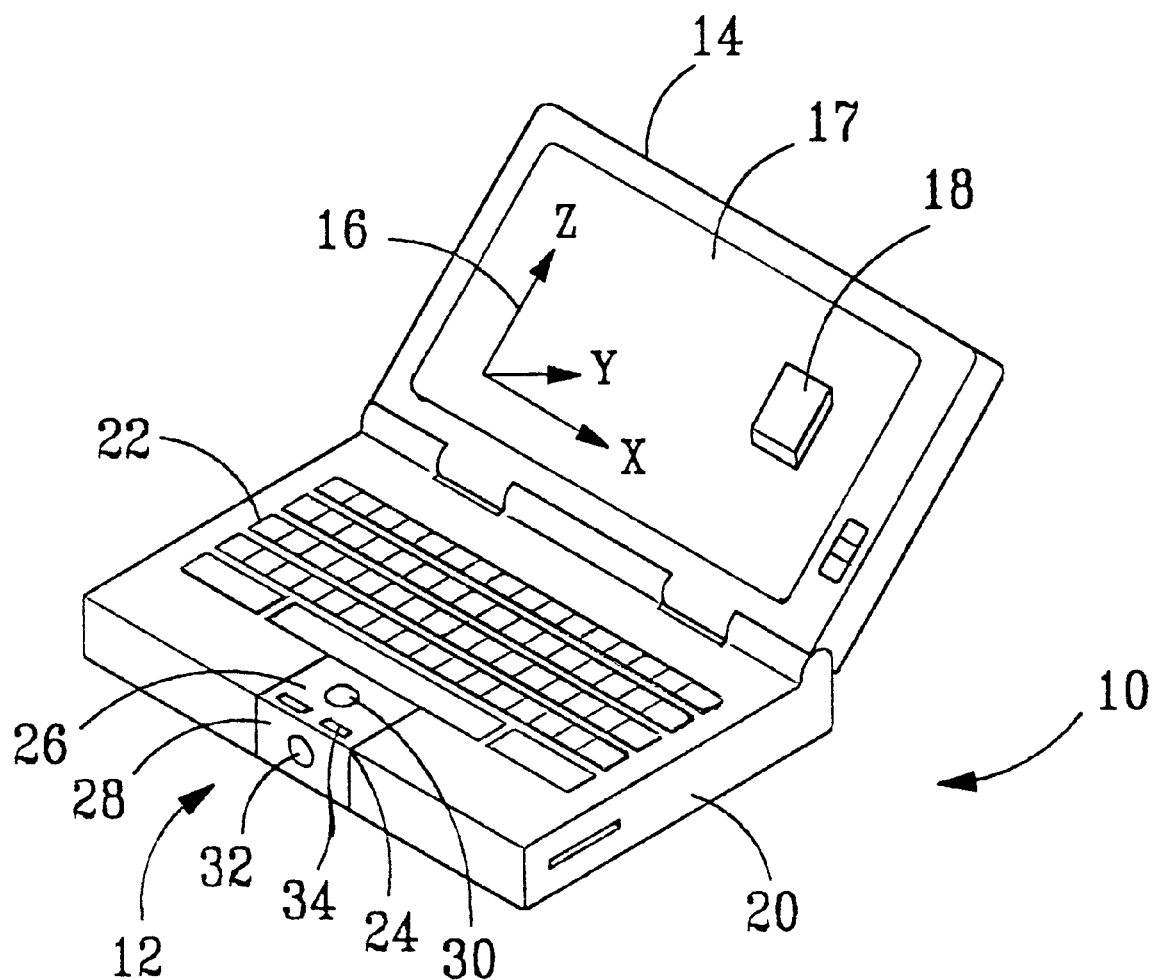
FIG. 1 is a schematic diagram of a pointing control system according to the present invention.

The pointing device 12 comprises a right-angled shell 24 having a horizontal plane 26 and a vertical plane 28, a first pointing controller 30 which is a track ball installed in the horizontal plane 26, a second pointing controller 32 which is also a track ball installed in the vertical plane 28, and two push buttons 34. Both the pointing controllers 30 and 32 are used for controlling rotations of the object 18.

The three dimensional view 16 comprises three mutually perpendicular axes X, Y and Z. The vertical plane formed by the screen 17 can be represented as X-Z plane. The Y axis is perpendicular to the screen 17. The first pointing controller 30 installed in the horizontal plane 26 is used for controlling rotations of the object 18 along X axis and Y axis whereas the second pointing controller 32 installed in vertical plane 28 is used for controlling rotations of the object 18 along X axis and Z axis.

The three dimensional view 16 presented over the screen 17 is substantially matched with the three dimensional arrangement of the horizontal plane 26 and the vertical plane 28 of the pointing device 12. A user can thus intuitively use the first pointing controller 30 on the horizontal plane 26 to manipulate rotations of the object 18 in X axis and Y axis, and use the second pointing controller 32 on the vertical plane 28 to manipulate rotations of the object 18 in X axis and Z axis.

Figure 2:
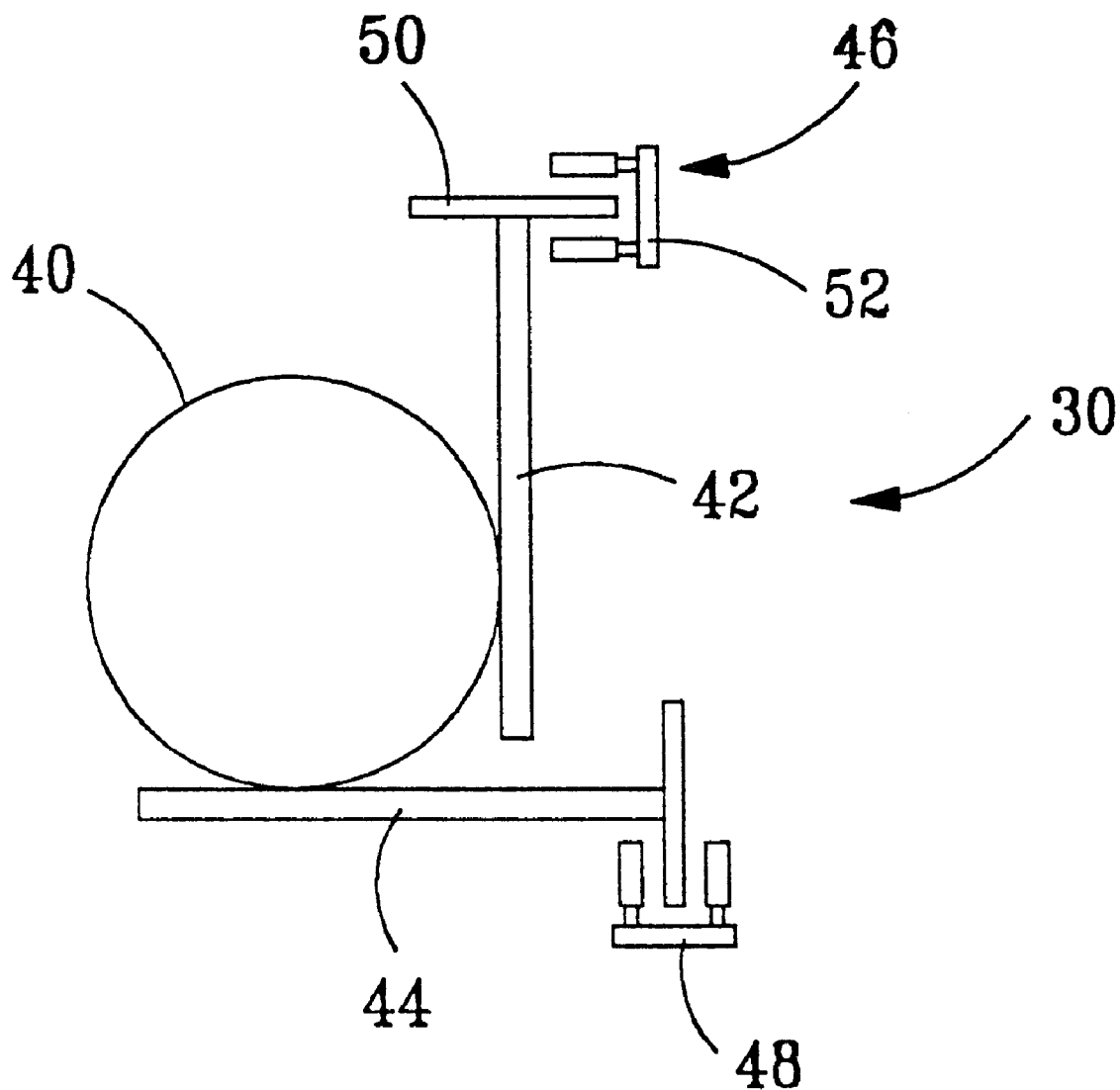
FIG. 2 is a schematic diagram of partial structure of the pointing device shown in FIG. 1.

Please refer to FIG. 2. FIG. 2 is a schematic diagram of the structure of the first pointing controller 30 shown in FIG. 1. The pointing controller 30 is a traditional track ball which comprises a ball 40 rotatably installed in the housing 24, two mutually perpendicular rods 42 and 44 rotatably installed in the housing 24 and attached to the ball 40 for interacting with the ball 40 to detect rotations of ball 40 in two different directions, a first angle displacement detector 46 for detecting rotations of the rod 42 and generating a corresponding first angle displacement signal, and a second angle displacement detector 48 for detecting rotations of the rod 44 and generating a corresponding second angle displacement signal. Each of the angle displacement detectors 46 and 48 comprises a wheel 50 installed at one end of the corresponding rod and a sensing device 52 for sensing rotations of the corresponding wheel 50 to generate the first or second angle displacement signal.

When the ball 40 is rotated by a user, both rods 42 and 44 will be driven and make the wheels 50 of the first and second angle displacement detectors 46 and 48 rotate. The sensing devices 52 of both angle displacement detectors 46 and 48 will then sense the rotations of the two wheels 50 and generate corresponding first and second angle displacement signals. The first angle displacement signal generated by the first angle displacement detector 46 is used for controlling rotations of the object 18 along Y axis and the second angle displacement signal generated by the second angle displacement detector 48 is used for controlling rotations of the object 18 along X axis.

The structure of the second pointing controller 32 shown in FIG. 1 is also the same as that of the first pointing controller 30 shown in FIG. 2. It also compresses a ball rotatably installed in the vertical plane 28 of the housing 24, two mutually perpendicular rods rotatably installed in the housing 24 for interacting with the ball to detect rotations of the ball and two angle displacement detectors for detecting rotations of the two rods and generating two corresponding angle displacement signals to control rotations of the object 18 along Z axis and X axis.

Figure 3:
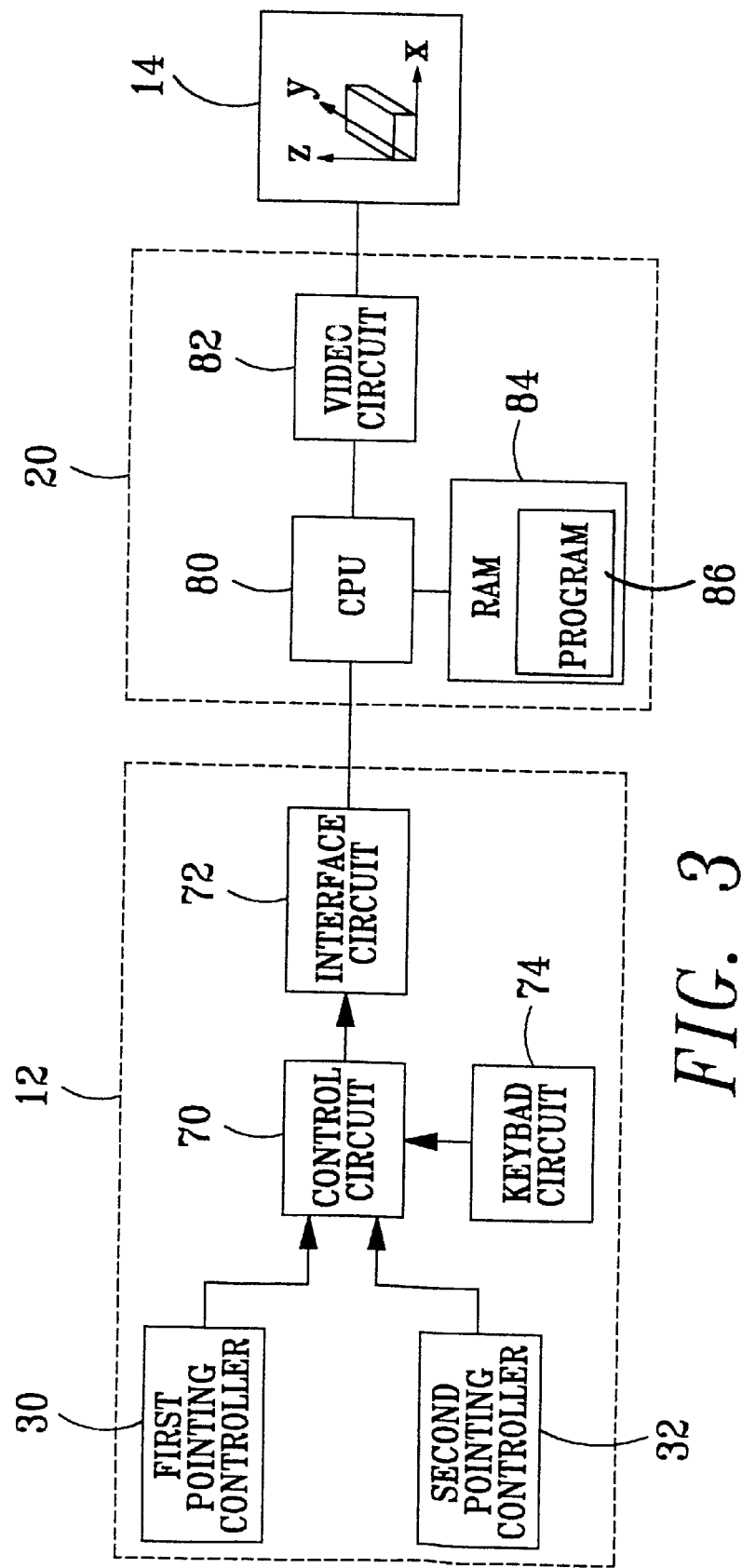
FIG. 3 is a function block diagram of the pointing control system shown in FIG. 1.

FIG. 3 is function block diagram of the pointing control system 10 shown in FIG. 1. System 10 comprises a pointing device 12, a displaying device 14 and a computer 20 electrically connected between the pointing device 12 and displaying device 14. The computer 20 comprises a RAM (random access memory) 84 for storing programs, a central processing unit 80 for executing programs stored in the memory 84, a display control program 86 stored in the memory 84 for controlling displays of the three dimensional view 16 over the displaying device 14 and rotations of the object 18 within the three dimensional view 16 according to angle displacement signals generated by the pointing device 12, and a video circuit 82 for processing video signals displayed over the displaying device 14.

The pointing device 12 comprises a first pointing controller 30 which is a track ball for generating two angle displacement signals to control rotations of the object 18 within the three dimensional view 16 along X axis and Y axis, a second pointing controller 32 which is also a track ball for generating two angle displacement signals to control rotations of the object 18 within the three dimensional view 16 along X axis and Z axis, a keypad circuit 74 composed of the two push buttons 34 for generating key signals, and a control circuit 70 for transmitting the signals generated by the pointing device 12 to the computer 20 through an interface circuit 72. After receiving the angle displacement signals transmitted from the interface circuit 72, the display control program 86 of the computer 20 will transform each angle displacement signal into a rotation angle according to a predetermined conversion method and then rotate the object 18 displayed in the three dimensional view 16 along a corresponding axis of the angle displacement signal.

When actuating the pointing controller 30 or 32, a user occasionally may wish to rotate the object 18 only along one axis instead of along two axes simultaneously. This can be done by having the display control program 86 to select the larger angle displacement signal and neglecting the smaller angle displacement signal when two angle displacement signals generated by a pointing controller are received at the same time.

Besides, if a user actuates the pointing controllers 30 and 32 at the same time, the program 86 will receive two angle displacement signals for rotating the object 18 along the X axis because each of the two pointing controllers 30 and 32 can generate an angle displacement signal to control rotations of the object 18 along the X axis. This will make the rotation speed of the object 18 along the X axis faster than the other two axes. Several methods can be used to handle this situation. For example, the display control program 86 can select the larger angle displacement signal and neglects the smaller one, or it can average the two signals first and then rotate the object 18 according to the averaged signal.

Figure 4:
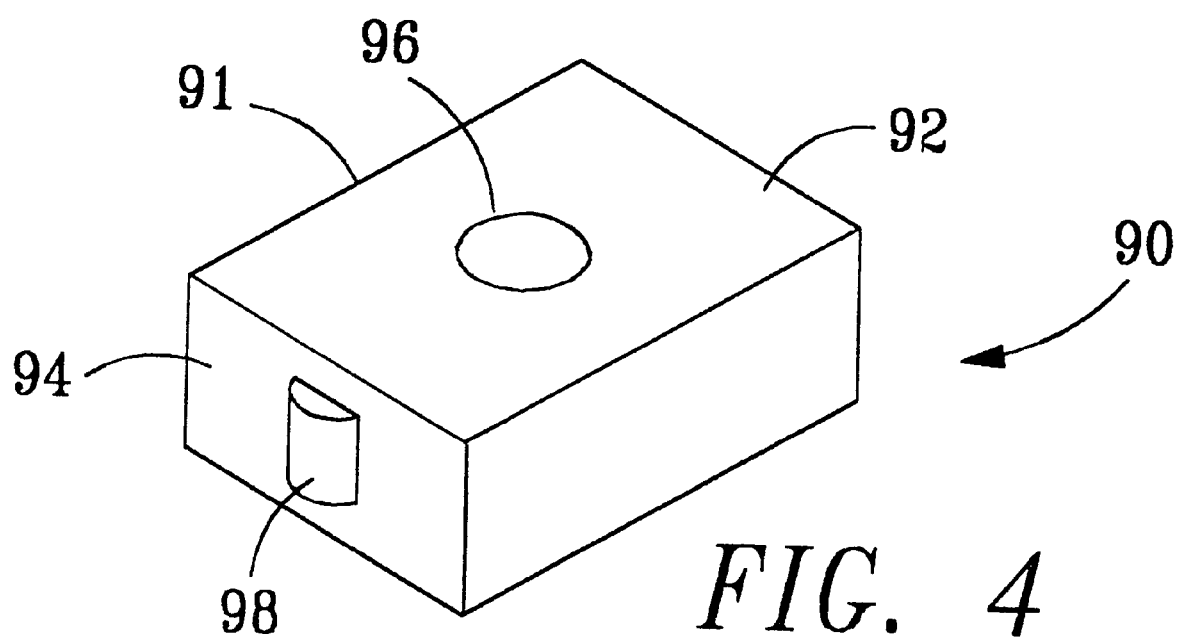
FIG. 4 is an alternative embodiment of the pointing device shown in FIG. 1.

Please refer to FIG. 4. FIG. 4 shows another pointing device 90 which is an alternative embodiment of the pointing device 12 shown in FIG. 1. The pointing device 90 comprises a housing 91 having a horizontal plane 92 and a vertical plane 94, a first pointing controller 96 which is a track ball installed in the horizontal plane 92, a second pointing controller 98 which is a rotatable wheel installed in the vertical plane 94 which can be rotated back and forth. The first pointing controller 96 is used for controlling rotations of the object 18 along X axis and Y axis, and the second pointing controller 98 is used for controlling rotations of the object 18 along Z axis. As compared with the pointing device 12 shown in FIG. 1, the second pointing controller 98 of the pointing device 90 only control rotations of the object 18 along one axis instead of two. The function block diagram of the pointing device 90 is basically the same as that of the pointing controller 12 shown in FIG. 3.

Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A pointing control system for controlling rotations of an object within a three dimensional view, the three dimensional view comprising first, second and third axes mutually perpendicular to one another, the pointing control system comprising a displaying device for displaying the three dimensional view, a computer electrically connected to the displaying device and a pointing device electrically connected to the computer, the computer comprising a program for controlling image display of the displaying device and rotations of the object within the three dimensional view, the pointing device comprising a housing having a horizontal plane and a vertical plane, a first pointing controller installed in the horizontal plane and a second pointing controller installed in the vertical plane, the first and the second pointing controllers both comprising:

(1) a ball rotatably installed inside the housing;
   (2) two mutually perpendicular rods rotatably installed in the housing and attached to the ball for interacting with the ball to detect rotations of the ball in two different directions; and
   (3) two angle displacement detectors installed in the housing for detecting rotations of the two rods and generating two corresponding angle displacement signals;

wherein when the program receives the two angle displacement signals of the first pointing controller, the program will transform the two angle displacement signals of the first pointing controller into two corresponding rotation angles of the first pointing controller and then rotate the object along the first axis and the second axis about the two corresponding rotation angles of the first pointing controller, and when the program receives the two angle displacement signals of the second pointing controller, the program will transform the two angle displacement signals of the second pointing controller into two corresponding rotation angles of the second pointing controller and then rotate the object along the first axis and the third axis about the two corresponding rotation angles of the second pointing controller.

2. The pointing control system of claim 1 wherein when the two angle displacement signals of the first or the second pointing controller are received by the program at the same time period, the program will select the larger angle displacement signal and neglect the smaller angle displacement signal.

3. The pointing control system of claim 1 wherein the first pointing controller is a track ball for generating the two angle displacement signals.

4. The pointing control system of claim 1 wherein the second pointing controller is a track ball for generating the two angle displacement signals.

5. The pointing control system of claim 1 wherein each of the two angle displacement detectors comprises a wheel installed at one end of the corresponding rod and a sensing device for sensing rotations of the wheel to generate the corresponding angle displacement signal.

6. A pointing control system for controlling rotations of an object within a three dimensional view, the three dimensional view comprising first, second and third axes mutually perpendicular to one another, the pointing control system comprising an image displaying device for displaying the three dimensional view, a computer electrically connected to the displaying device, and a pointing device electrically connected to the computer, the computer comprising a program for controlling image display of the displaying device and rotations of the object within the three dimensional view, the pointing device comprising a housing having a horizontal plane and a vertical plane, a first pointing controller installed in the horizontal plane for generating a first and a second angle displacement signals, and a second pointing controller installed in the vertical plane for generating a third angle displacement signal, the first pointing controller comprising:

(1) a ball rotatably installed in the horizontal plane;

(2) two mutually perpendicular rods rotatably installed in the housing for interacting with the ball to detect rotations of the ball; and (3) two angle displacement detectors installed in the housing for detecting rotations of the two rods and generating the first and second angle displacement signals;

wherein when the program receives the first, second or third angle displacement signal, the program will transform the received signal into a rotation angle and then rotate the object along the first, second or third axis about the rotation angle.

7. The pointing control system of claim 6 wherein the first pointing controller is a track ball for generating the two angle displacement signals.

8. The pointing control system of claim 6 wherein the second pointing controller is a rotatable wheel which can be rotated back and forth for generating the third angle displacement signal.

* * * * *